United States Patent Office 3,578,631
Patented May 11, 1971

3,578,631
METHOD OF PRODUCING MODIFIED POLYARYLATES
Vasily Vladimirovich Korshak, Ulitsa Gubkina 4, kv. 81; Svetlana Vasilievna Vinogradova, Jugo-Zapad kvartal 42–a, korpus 1, kv. 35; and Dzidra Rudolfovna Tur, Ulitsa Vavilova 30–a, kv. 120, all of Moscow, U.S.S.R.
No Drawing. Filed Mar. 1, 1967, Ser. No. 619,560
Claims priority, application U.S.S.R., Mar. 1, 1966, 1,058,760
Int. Cl. C08g 33/04
U.S. Cl. 260—47     1 Claim

ABSTRACT OF THE DISCLOSURE

Modified polyarylates which are polyhydrazide-polyarylates are produced by condensing dicarboxylic acyl chlorides with bisphenols and hydrazine or dihydrazides of dicarboxylic acids. The modified polyarylates may be further converted to poly-1,3,4-oxadiazol polyarylates by heating in vacuum to 250–350° C.

This invention relates to chemical technology and, more particularly, to modified polyarylates and methods of producing the same.

There are known certain modified polyarylates which possess high heat resistance and thermal stability, good solubility in organic solvents and high electric and mechanical characteristics.

It is an object of the present invention to provide novel modified polyarylates possessing even higher thermal stability while retaining the above properties which are characteristic of modified polyarylates.

It is another object of the invention to provide novel chemical compounds relating to modified polyarylates, namely, polyhydrazide-polyarylates.

These compounds may be employed as thermal stable electric insulating and antifriction materials, film dielectrics, as well as for preparing varnish coatings and film compositions.

It is another object of the invention to provide a method of producing polyhydrazide-polyarylates, wherein dicarboxylic acyl chlorides are condensed with bisphenols in the presence of modifying additives, said additives being hydrazine or the dihydrazides of dicarboxylic acids.

It is still another object of the invention to provide novel chemical compounds relating to modified polyarylates, viz, poly-1,3,4-oxadiazol-polyarylates, which are produced by treatment the polyhydrazide-polyarylates and are employed for the same purposes.

Said treatment of the polyhydrazide-polyarylates consists in heat treatment in vacuum at a temperature of 250–350° C.

The present method of producing the polyhydrazide-polyarylates is carried out in the following way.

Bis-phenols, hydrazine or the dihydrazides of dicarboxylic acids are polycondensed with dicarboxylic acyl chlorides to produce polyhydrazide-polyarylates, the synthesis of said polyhydrazide-polyarylates being accomplished by interphase polycondensation or high or low-temperature polycondensation in solution.

To produce poly-1,3,4-oxadiazol-polyarylates, said polyhydrazide-polyarylates are subjected to thermal cyclodehydration, as a result of which the chain is closed to form the 1,3,4-oxadiazol ring.

The process of this invention is illustrated in the following examples of the production of polyhydrazide-polyarylates and poly-1,3,4-oxadiazol-polyarylates.

EXAMPLE 1

Into a flask equipped with a stirrer and a bubbler for the delivery of nitrogen are placed 0.876 g. (0.0025 mol) of 9,9-bis-(4-hydroxyphenyl)-fluorene, 1.015 g. (0.005 mol) of isophthaloyl chloride and 2.5 ml. of tetralin. The reaction mixture is gradually heated to 195° C. and polycondensation is carried out in a stream of nitrogen at 195° C. over a period of 10 hrs., after which the tetralin is distilled off at 100° C. (1 mm. Hg).

The low-molecular weight polyarylate which is obtained is dissolved in 5 ml. of hexamethylphosphoramide and the solution is added with vigorous stirring to a solution of 0.486 g. (0.0025 mol) of the dihydrazide of isophthalic acid in 5 ml. of hexamethylphosphoramide, and the reaction mixture is stirred at −10° C. for about 1 hr. and then at room temperature for several hours. The viscous solution obtained is poured into water. The precipitated polymer is filtered out, washed with hot water and organic solvents and dried in vacuum at about 80° C.

The yield of polyhydrazide-polyarylate is ∼50% of theory. Reduced viscosity in tricresol is 0.15 dl./g.; softening point in a capillary tube is 270–280° C. The polymer is readily soluble in tricresol, tetrachloroethane-phenol mixture, dimethyl sulfoxide and hexamethylphosphoramide.

The mixed polymer containing arylate and hydrazide units in the chain thereof is subjected to cyclodehydration by heating same in vacuum at 250–300° C. for 20–30 hr. The poly-1,3,4-oxadiazol-polyarylate thus obtained does not melt below the decomposition point which, according to thermogravimetric analysis, is above 400° C.

The poly-1,3,4-oxadiazol-polyarylate can be produced without preliminary isolation of the intermediate polyhydrazide-polyarylate which is formed in the first stage of the reaction. In this case the solvent is distilled off from the reaction mixture and the polymer residue heated for 20–30 hr. in vacuum at 250–300° C.

EXAMPLE 2

To an aqueous alkaline solution of 9,9-bis-(4-hydroxyphenyl)-fluorene and the dihydrazide of isophthalic acid [0.876 g. (0.0025 mol) 9,9-bis-(4-hydroxyphenyl)-fluorene, 0.486 g. (0.0025 mol) dihydrazide of isophthalic acid, 0.40 g. sodium hydroxide, 50 ml. water] is added dropwise over a period of about 10 min. a solution of 1.015 g. (0.005 mol) of isophthaloyl chloride in 50 ml. benzene and the reaction mixture stirred for about 20 minutes more. The polymer produced is precipitated with methanol, filtered out, washed with hot water and organic solvents and dried in vacuum at 80° C.

The yield of polymer is ∼80% of theory. The polymer is soluble in dimethylsulfoxide and hexamethylphosphoramide. The reduced viscosity in dimethylsulfoxide is 0.15 dl./g.; softening point in a capillary tube is 270–280° C.

The polymer is subjected to cyclodehydration as described in Example 1. After cyclization the polymer does not soften below the decomposition point which, according to thermogravimetric analysis, is above 400° C. According to the findings of elemental analysis, the cyclization is quantitative.

EXAMPLE 3

To a mixture of 12.5 ml. of 1,2-dichloroethane, 0.796 g. (0.0025 mol) of phenolphthalein and 0.7 ml. of triethyl amine cooled to +10° C. are added with stirring 1.015 g. (0.005 mol) of isophthaloyl chloride and the reaction mixture stirred for about 1.5 hr.

The solution of low-molecular weight polyarylate in 1,2-dichloroethane is slowly added with stirring to a solution of 0.486 g. (0.0025 mol) of the dihydrazide of isophthalic acid in 5 ml. of hexamethylphosphoramide cooled to −10° C. The reaction mixture is stirred for 1 hr. at −10° C. and then for 5–7 hr. at room temperature. The viscous solution obtained is poured into methanol. The precipitated polymer is filtered out, washed with water and then with organic solvents, and dried in vacuum at a temperature of 80° C.

The yield of polymer is ~85% of theory. The polymer is soluble in tricresol, tetrachloroethane-phenol mixture, dimethylsulfoxide and hexamethylphosphoramide; the reduced viscosity in tricresol is 0.47 dl./g. When a solution of the polymer in tetrachloroethanephenol mixture is poured onto a glass rod, a strong transparent film is formed. Softening point in a capillary tube is 300–310° C.

To convert the polyhydrazide-polyarylate obtained into the corresponding poly-1,3,4-oxadiazol-polyarylate it is subjected to thermal cyclodehydration as described in Example 1. The poly-1,3,4-oxadiazol-polyarylate does not soften below the decomposition point which, according to thermogravimetric analysis, is 460° C.

EXAMPLE 4

To a mixture of 25 ml. of 1,2-dichloroethane, 2.453 g. (0.005 mol) of 9,9-bis-(4-hydroxyphenyl)-fluorene and 1.4 ml. of triethyl amine cooled to +10° C. are added with stirring 2.030 g. (0.01 mol) of isophthaloyl chloride and the reaction mixture is stirred for about 1.5 hr.

The solution of low-molecular weight polyarylate in 1,2-dichloroethane thus obtained is slowly added with stirring to a solution of 0.163 g. of hydrazine in 10 ml. of hexamethylphosphoramide cooled to −10° C. Further conditions of the reaction and isolation of the polymer are analogous to those described in Example 1.

The yield of polyhydrazide-polyarylate is ~85% of theory. The polymer is soluble in tricresol, dimethylsulfoxide and hexamethylphosphoramide; the reduced viscosity in tricresol is 0.2 dl./g. Softening point in a capillary tube is 270–280° C.

The polymer produced is subjected to thermal cyclodehydration as described in Example 1.

The poly-1,3,4-oxadiazol-polyarylate does not soften below the decomposition point, which is above 400° C.

Though the present invention has been described in accordance with a preferred embodiment of the invention, it will be understood by those skilled in the art that various changes and modifications may be made in carrying out the invention without departing from the spirit and scope thereof. These changes and modifications are to be considered as falling within the spirit and scope of the present invention as defined in the appended claim.

What is claimed is:

1. A method of producing poly-1,3,4-oxadiazol-polyarylates, said method comprising subjecting to heat treatment in vacuum at a temperature of 250–350° C., polyhydrazide-polyarylates which are obtained by condensing dicarboxylic acyl chlorides with bisphenols and hydrazine or with dihydrazides of dicarboxylic acids.

References Cited
UNITED STATES PATENTS

| | | | |
|---|---|---|---|
| 3,238,183 | 3/1966 | Frazer | 260—78.4 |
| 3,305,603 | 2/1967 | McIntyre et al. | 260—860 |

WILLIAM H. SHORT, Primary Examiner

L. L. LEE, Assistant Examiner

U.S. Cl. X.R.

260—30.6, 30.8, 32.6, 33.4, 33.8